(No Model.)

J. A. MORRELL.
CONCENTRATING AND EVAPORATING LIQUIDS.

No. 441,371. Patented Nov. 25, 1890.

Witnesses:

Inventor
J. A. Morrell,
per J. E. Duff
Atty

UNITED STATES PATENT OFFICE.

JAMES A. MORRELL, OF LANSDALE, ASSIGNOR OF ONE-HALF TO GIDEON W. MARSH, OF PHILADELPHIA, PENNSYLVANIA.

CONCENTRATING AND EVAPORATING LIQUIDS.

SPECIFICATION forming part of Letters Patent No. 441,371, dated November 25, 1890.

Application filed June 3, 1890. Serial No. 354,098. (No model.)

*To all whom it may concern:*

Be it known that I, JAMES A. MORRELL, of Lansdale, in the county of Montgomery and State of Pennsylvania, have invented certain new and useful Improvements in Concentrating and Evaporating Liquids; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in methods of and apparatus for evaporating and concentrating liquids.

The object of the invention is to provide an improved process of and apparatus for evaporating and concentrating liquids, particularly adapted for use in concentrating saccharine liquids in the manufacture of sugar, whereby the concentration will be performed with rapidity, effectually, economically, and resulting in a superior concentrated solution. These objects are accomplished by and this invention consists in the process or method hereinafter set forth, and in certain novel features of construction and in combinations of parts more fully described hereinafter, and particularly pointed out in the claims.

Figure 1:
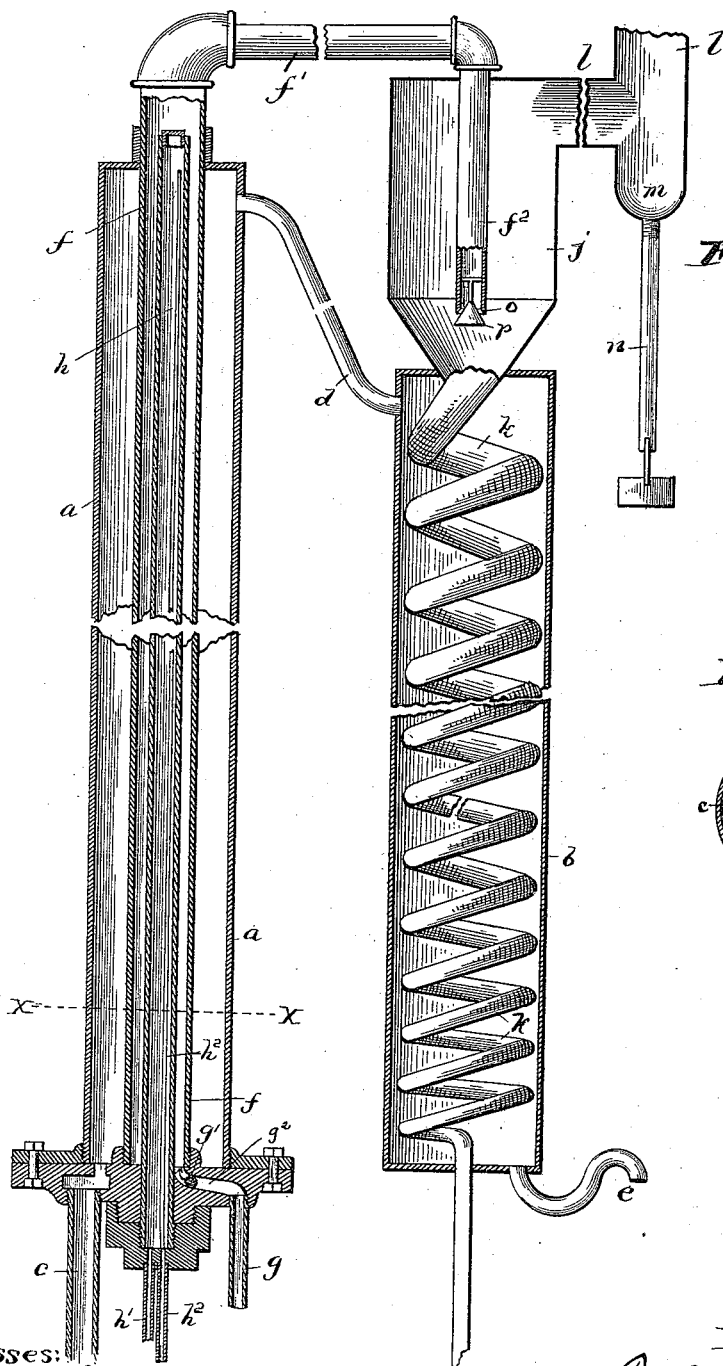
Figure 2:
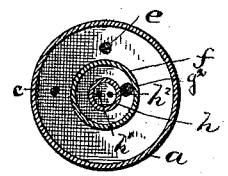

Referring to the accompanying drawings, which illustrate an example of an apparatus for carrying out this method, Figure 1 is a longitudinal vertical section of the apparatus. Fig. 2 is a cross-section on line $x\,x$, Fig. 1.

In the drawings, the reference-letters $a$ and $b$ indicate two preferably vertical evaporating and heating chambers suitably mounted and closed at both ends. These cylinders are preferably clothed with non-conducting material (not shown) to prevent escape of heat. A steam-pipe $c$ opens into the lower end of the heating-chamber $a$, and a steam-pipe $d$ extends from the upper end of the chamber $a$ into the upper end of chamber $b$. $e$ are suitable discharges from the lower ends of the heating-chambers for water.

$f$ is a liquid-heating pipe or chamber extending longitudinally and centrally throughout the length of the chamber $a$ and above the same, and at its upper end provided with the reduced transverse portion $f'$, terminating in the downwardly-extending discharge end $f^2$. The bottom flange or head of chamber $a$ is provided with a conduit $g^2$, extending therethrough into the lower end of chamber $f$. The liquid-supply pipe $g$ and the hot-air or steam injector $g'$ open into said conduit $g^2$, so that a cyclonic or twirling motion is given the liquid as it enters said chamber under pressure and at an angle.

$h$ is a heating-core longitudinally located within and of less diameter than the liquid-heating pipe. This pipe or core is plugged or otherwise closed at its upper end, and is provided at its lower end with a discharge-pipe $h'$ for the water of condensation from said heating-core.

$h^2$ is a small steam-pipe in and longitudinally extending from the bottom almost to the upper end of said core, with its upper open end a short distance from the upper end of the core. The steam passing in the small steam-pipe is discharged in the upper end of the core and fills and highly heats the same.

$j$ is an evaporating-chamber above heating-chamber $b$ and surrounding the upper discharge end $f^2$ of the liquid-heating pipe. This chamber has a conical bottom terminating in the upper end of a coiled pipe or worm $k$, extending through the length of the heating-chamber $b$, with its discharge end extending through the bottom of said heating-chamber. This worm gradually decreases in diameter from its upper end downwardly. In practice the upper end of the worm is usually six inches in diameter, tapering down and decreasing so that the lower discharge end is about one inch and a half in diameter.

$l$ is a lateral vapor-discharge from the upper portion of the evaporating-chamber $j$, provided with discharging uptake $l'$, having pocket $m$ at the lower end of the uptake provided with a discharge-pipe $n$ to a suitable receptacle to catch all vapors which may be condensed in the uptake, thereby preventing the waste of any saccharine matter. The open discharge end $o$ of the liquid-heating pipe is centrally located over the bottom of chamber $j$.

$p$ is a spreader or sprayer suitably located at the open discharge end of the liquid-pipe and arranged so as to throw the liquid from said end in thin sheets against the inclined bottom of the chamber $j$.

Live steam from a boiler is discharged into the heating-core and fills the same, and superheated steam is passed through pipe $c$ into heating-chamber $a$, and through heating-chamber $a$ and pipe $d$ into the upper end of heating-chamber $b$ and throughout the length of said chamber, and as the steam condenses the water and flows out at pipe $e$ perfect circulation of and thorough heating by the steam is thus attained.

The liquid to be concentrated is forced under pressure through pipe $g$ into the lower end of the liquid-heating pipe $f$, mixed with air or gas injected thereinto by injector or pipe $g$. The liquid passes up with a twirling motion in a thin layer or spray in the narrow space between the heating-core $h$ and the inner wall of heating-chamber $a$, formed by the liquid-heating pipe. Thus the liquid is quickly and thoroughly heated while under pressure to a very high degree and to a temperature beyond the normal temperature of ebullition or vaporization of the liquid when in an open vessel exposed to the ordinary pressure of the atmosphere only. The highly-heated liquid passes through the reduced portions $f'$ $f^2$ of the liquid-heating pipe with increased velocity, and hence shoots out of the discharge end $o$ of the pipe under considerable velocity and is thrown laterally in thin sheets by the spreader $p$ against the inclined bottom walls of the chamber $j$, whereby the highly-heated liquid is finely atomized and the vapor released by being suddenly released from under pressure and thrown in fine thin sprays through the chamber forcibly against a rigid surface, and the fine vaporized portions float up out of chamber $j$ through discharge $l$ and uptake $l'$, while the heavier particles which do not pass off as vapor gradually flow down the conical bottom of chamber $j$ into the upper end of the worm $k$, and this liquid flows down through the worm and is very highly heated in its passage through the same by the superheated steam in chamber $b'$. As before mentioned, the liquid is driven by a blast of hot air or steam forced thereinto through the heating-chamber, wherein it is superheated while in transit, so that when forcibly discharged it immediately releases the vapor while the liquid flows into the worm or heating-chamber $k$, wherein it is concentrated. The worm retards the direct passage of the liquid through the steam-chamber, retaining it longer under the influence of the heat, whereby it is thoroughly concentrated, and also the gradual upward increase in the size of the worm allows free expansion and upward escape of all vapor generated. The resulting liquid discharging from the lower end of the worm is highly concentrated and is usually of almost the consistency of jelly. This process is exceedingly rapid and thorough, and is not confined to use for the concentration of saccharine liquids, but is adapted for evaporating and concentrating any liquid, such as brine, acids, &c.

It is evident that various changes might be made in the form and arrangements of the parts described without departing from the spirit and scope of my invention. Hence I do not wish to limit myself to the precise construction herein set forth.

What I claim is—

1. In an apparatus for concentrating liquids, a liquid-heating pipe passing through a heating-chamber and having a discharge end, another heating-chamber, and a vertical worm in said chamber having a discharge at its lower end and having its upper end arranged to receive the liquid discharged from said pipe, substantially as described.

2. In a concentrating apparatus, the combination, with two closed steam-chambers, of a steam-pipe into an end of one chamber, a steam-pipe connecting the tops of said two chambers, a liquid-heating pipe extending through the first-mentioned chamber containing a heating-core, and a heating-chamber extending through the second steam-chamber having a discharge at its lower end, said liquid-heating pipe having a discharge end to spray liquid into said heating-chamber, substantially as described.

3. In a concentrating apparatus, the combination of a liquid-heating pipe provided with an exterior heating-jacket and a discharge end, a heating-chamber, a coil or worm therein having a discharge at its lower end, and a chamber surrounding the discharge end of said pipe and having a bottom terminating in the upper end of the worm, substantially as described.

4. In a concentrating apparatus, a liquid-heating pipe, in combination with a continuous heating-worm having an open upper end to receive the discharge from said pipe, said worm gradually decreasing downwardly in size and extending longitudinally through a vertical heating-chamber, as set forth.

5. A concentrating apparatus consisting of two closed upright steam-chambers, a liquid-heating pipe extending through one of said chambers, and a liquid heating and evaporating chamber extending through the other steam-chamber and provided with a discharge at its lower end, said liquid-heating pipe having a discharge end arranged to spray the liquid into said heating-chamber, said heating-chamber being arranged with a rigid wall against which the liquid is sprayed, substantially as described.

6. In an evaporating and concentrating apparatus, the combination of a steam-chamber, a liquid superheating and vaporizing pipe extending therethrough, another steam-chamber, and an upright liquid-heating chamber extending through said last-mentioned steam-chamber having a discharge at its lower end, said heating-pipe having a discharge end through which the superheated liquid is discharged and from which it passes into said liquid-heating chamber, substantially as described.

7. In an evaporating apparatus, the combination of the liquid superheating and vaporizing pipe having a contracted discharge to spray out the liquid, means for heating said pipe, a chamber surrounding said discharge of the pipe, said chamber having a vapor-exit and a liquid-discharge, and the upright liquid-heating worm arranged to receive the liquid from said chamber, substantially as described.

8. The herein-described mode of evaporating and concentrating liquids, which consists in forcing a blast of hot air or steam into the liquid, superheating the liquid in a thin layer while confined and in transit, discharging the liquid forcibly and in fine spray and thereby releasing the vapor, catching the precipitated liquid and treating the same while in transit to a high degree of heat, and retarding and prolonging the flow of said liquid while heated, as set forth.

In testimony that I claim the foregoing as my own I affix my signature in presence of two witnesses.

JAS. A. MORRELL.

Witnesses:
H. B. S. MORRELL,
B. F. CRESSMAN.